United States Patent [19]

Solari

[11] Patent Number: 5,241,628

[45] Date of Patent: Aug. 31, 1993

[54] METHOD WHEREIN SOURCE ARBITRATES FOR BUS USING ARBITRATION NUMBER OF DESTINATION

[75] Inventor: Edward L. Solari, Monmouth, Oreg.

[73] Assignee: Intel Corporation, Santa Clara, Calif.

[21] Appl. No.: 461,045

[22] Filed: Jan. 4, 1990

[51] Int. Cl.⁵ .............................................. G06F 13/36
[52] U.S. Cl. .................................. 395/325; 364/242.6; 364/937.01
[58] Field of Search ..................... 395/725, 325; 364/DIG. I MS File, DIG. II MS File

[56] References Cited

U.S. PATENT DOCUMENTS

| | | | |
|---|---|---|---|
| 3,810,114 | 5/1974 | Yamada | 364/200 |
| 3,925,766 | 12/1975 | Bardotti | 364/200 |
| 3,993,981 | 11/1976 | Cassarino et al. | 364/200 |
| 4,059,851 | 11/1977 | Nutter | 364/200 |
| 4,570,220 | 2/1986 | Tetrick et al. | 364/200 |
| 4,807,109 | 2/1989 | Farrell et al. | 364/200 |

*Primary Examiner*—David Y. Eng
*Attorney, Agent, or Firm*—Blakely, Sokoloff, Taylor & Zafman

[57] ABSTRACT

An improved method of supporting service requests in certain bus architectures is disclosed. According to the presently invented method, the source, instead of using its own arbitration number, uses the arbitration number of the destination when performing an interrupt or DMA request. The destination then recognizes that it has been granted bus ownership, even though it was not arbitrating for the bus originally. The destination can therefore immediately assume that a request has occurred and immediately thereafter begin its request service routine.

15 Claims, 3 Drawing Sheets

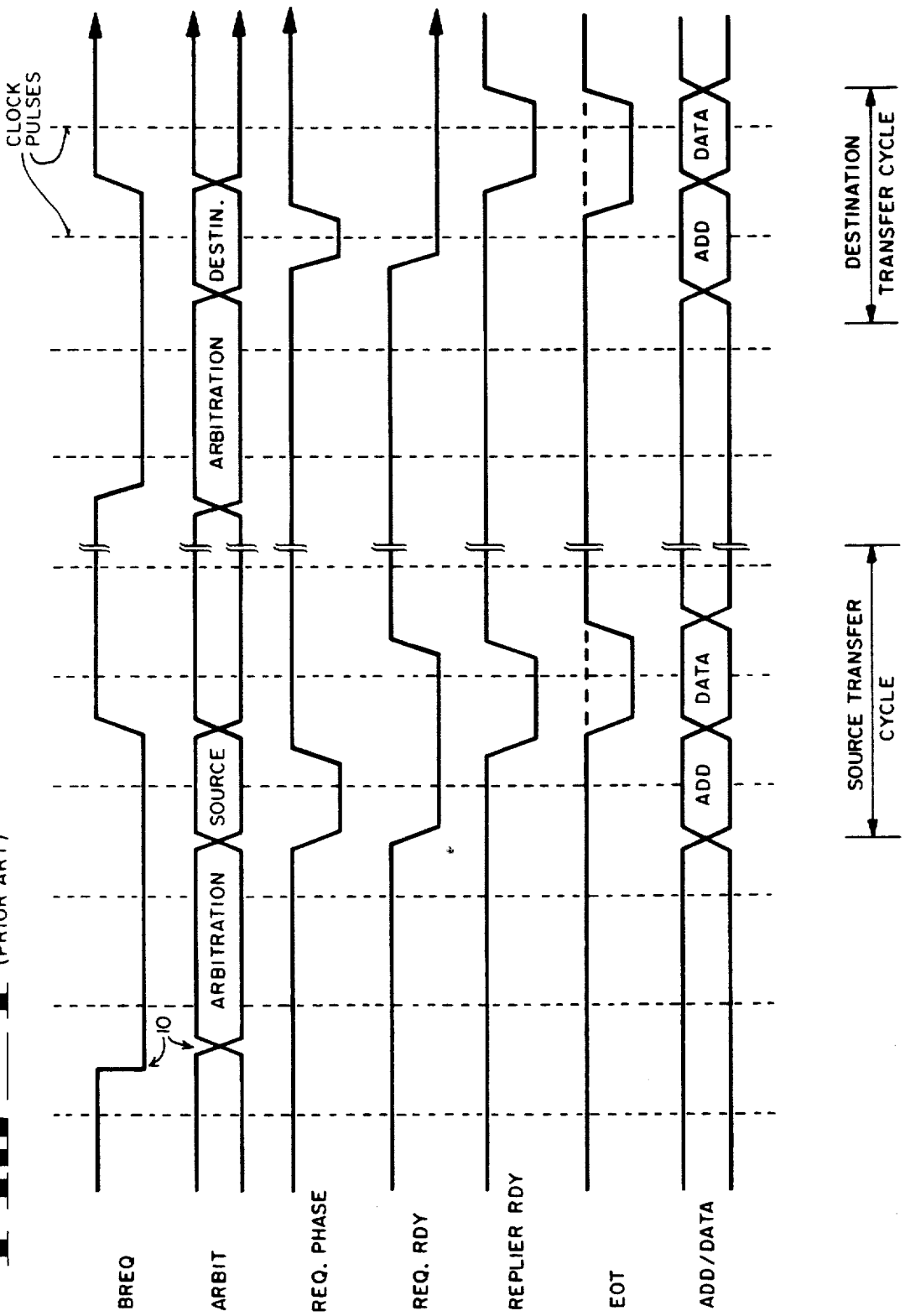
FIG_1 (PRIOR ART)

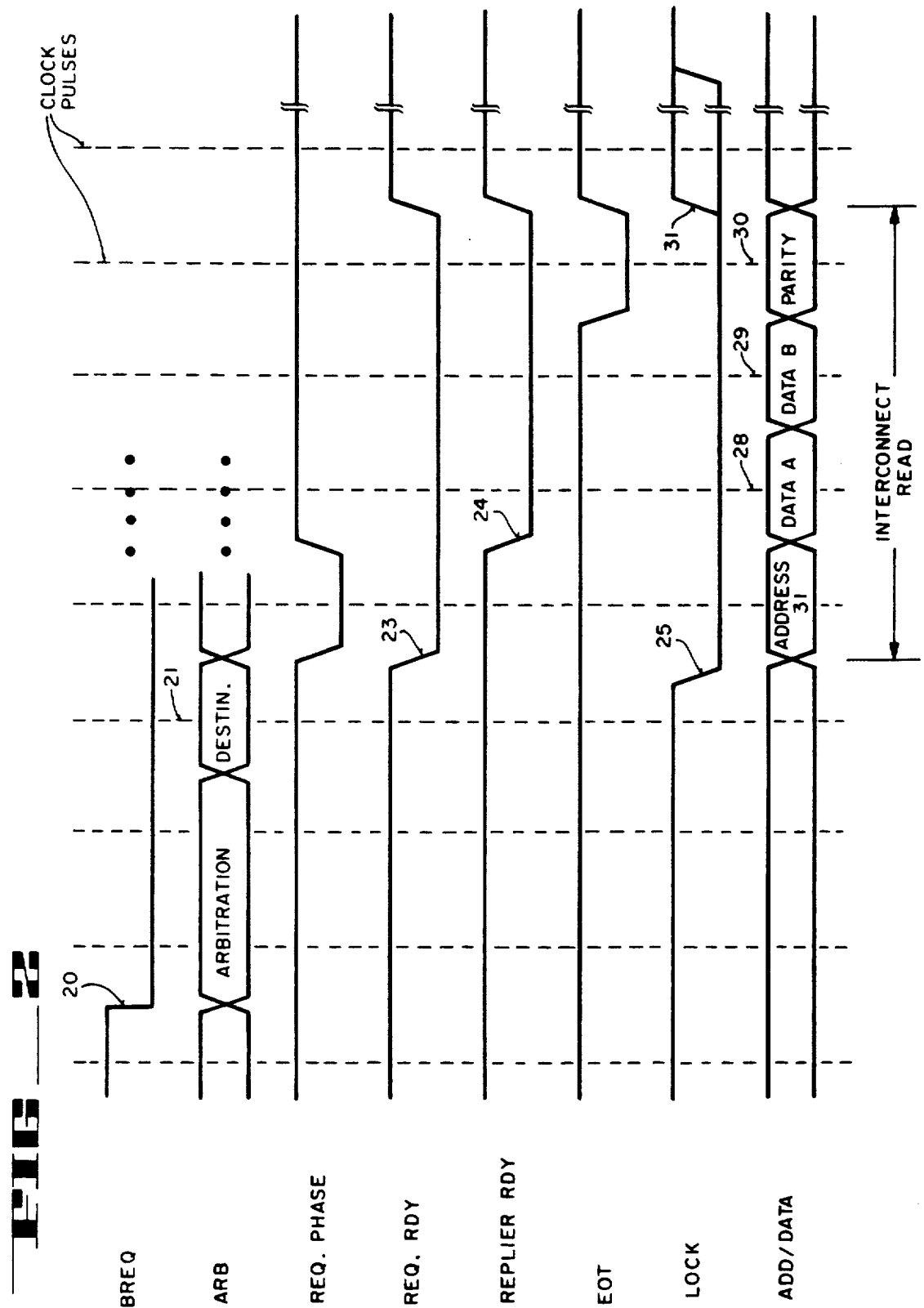

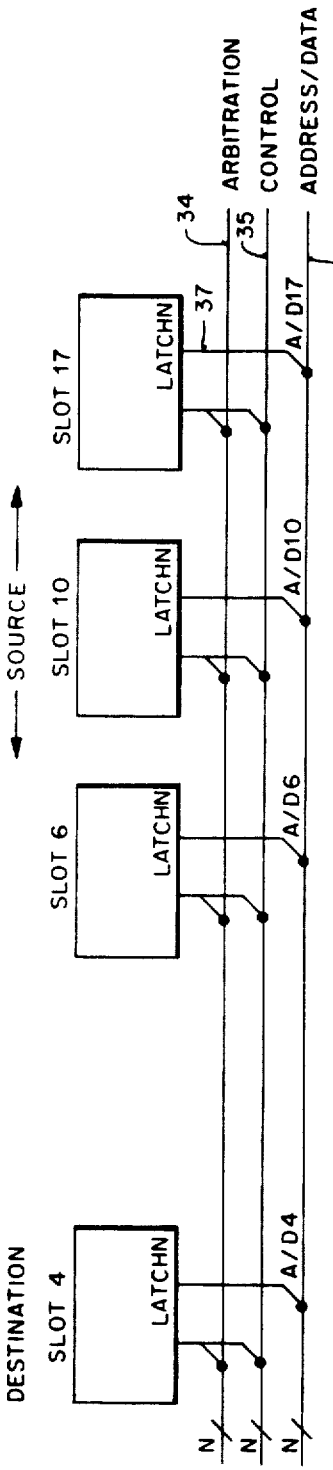
FIG_3
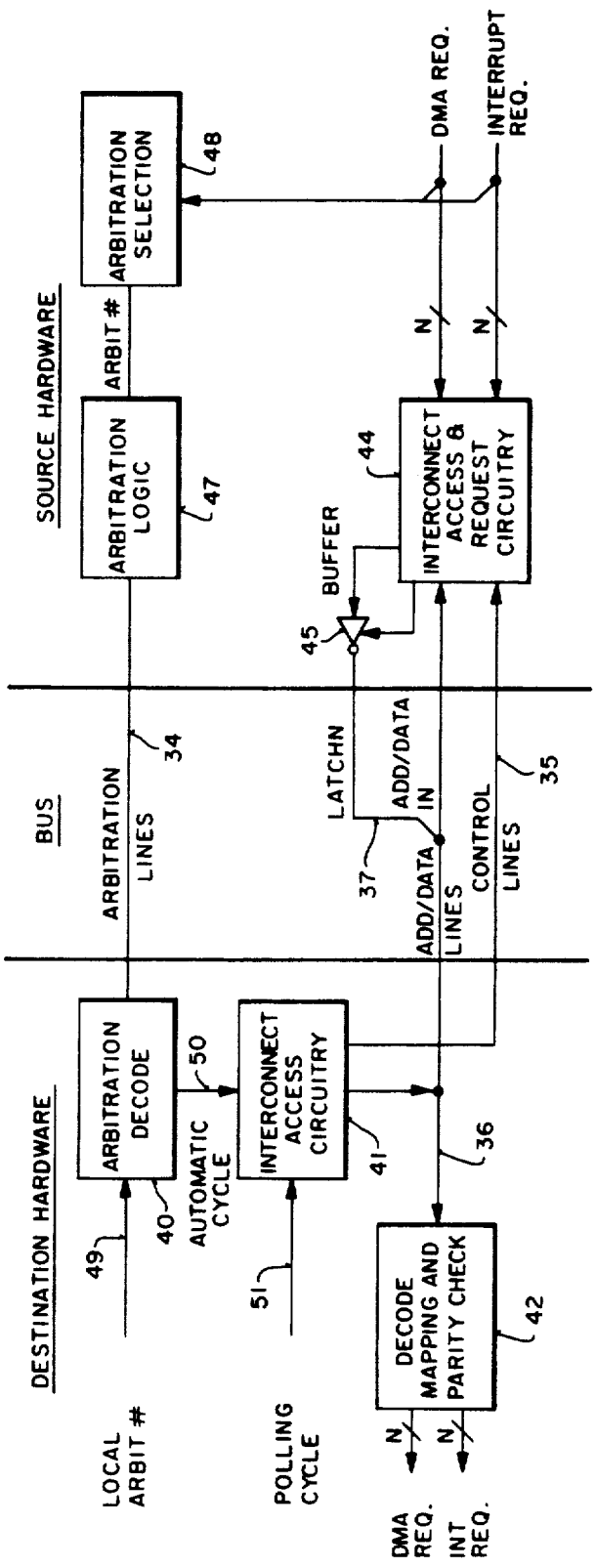
FIG_4

METHOD WHEREIN SOURCE ARBITRATES FOR BUS USING ARBITRATION NUMBER OF DESTINATION

RELATED APPLICATIONS

The present application is related to U.S. Pat. Nos. 4,570,220 of Tetrick et al., and 4,807,109 of Farrell et al., and hereby refers to, and incorporates by reference the contents of the above-referenced patents. The above-referenced patents have been assigned to the assignee of the present invention.

FIELD OF THE INVENTION

The present invention relates to mechanisms and methods for transferring data between a source and a plurality of receiving data processing devices. More particularly, the present invention relates to a method by which one agent informs another agent of the need for some sort of service.

BACKGROUND OF THE INVENTION

In the computing industry it is quite common to transfer data and commands between a plurality of data processing devices, such as for example, computers, printers, memories and the like, across a system or data bus. The usual bus architecture includes both a parallel and serial bus which interconnects data processing units and peripheral devices (collectively referred to as "agents") to permit the exchange of data and messages at high speed. For any bus connected to multiple agents (e.g., printed circuit boards) there arises a need for one agent (frequently referred to as the "source") to inform another agent (frequently referred to as the "destination") that it requires some sort of service. This mechanism by which a source informs a destination that it requires service is called a "request". The service requested can be in the form of data or other system information.

In a bus architecture where more than one agent can control the bus or gain ownership to inform the destination that it needs service, a mechanism must exist to decide which agent is permitted ownership of the bus at any particular time. Most often, a scheme known as "arbitration" is used. Arbitration allows the different agents to determine which agent will be the next bus owner. The decision as to who will be the next bus owner among the different agents is made on the basis of a priority which is reflected in the "arbitration number" used by the particular agent. That is, in an arbitration scheme, each agent is assigned a priority number which determines when that agent will become the next bus owner.

Various methods have been devised by particular bus architectures for sending interrupt requests or direct memory access (DMA) requests to the destination. Buses like Micro-channel, EISA, VME, and MultiBus I (e.g., "MBI") employ discrete interrupt or DMA request lines interconnected among the various agents. These discrete lines are not available in bus architectures like MultiBus II (e.g., "MBII").

In a bus architecture which employs discrete interrupt or DMA request lines, the source simply enables one of the discrete lines so that the destination is immediately notified that service has been requested. The destination agent can thereafter begin arbitrating for ownership of the bus. The latency, i.e., the time period between which the source enables one of the discrete interrupt or DMA request lines and the time that the destination responds, is dependent only upon the priority of the destination. As is appreciated by practitioners in the field, the chief drawback of the discrete interrupt or DMA lines request scheme is the obvious requirement of additional lines interconnected between the various agents. In a data processing system that includes many agents or boards, the number of required discrete interrupt or DMA lines can quickly become excessive.

As an alternative to separate sets of discrete interrupt request lines, other bus architectures have resorted to different methods. For example, in the MultiBus II architecture, the source sends an interrupt or DMA type of request to the destination in the form of a message. This approach is commonly referred to as a source request method. The message which is sent is simply a collection of data write cycles that contains appropriate information. This message, in the MBII case, is a block of 32 bytes containing an encoded request for interrupt or DMA service. The clear advantage of a bus architecture such as MultiBus II is that by eliminating the use of discrete request lines, many more potential sources are now available. Also, once bus ownership is granted to an agent, that agent can then send over the actual message.

In bus architectures which are similar to MBII, prior to sending a message to the destination the source must first arbitrate in order to become the bus owner. Once bus ownership has been granted, the source may then send the request message to the destination. The length of time between the source requesting service and the destination providing that service is called the latency period. Note that the latency can be very long since the source must first arbitrate for the bus using its own arbitration number. Next, it must send the interrupt request message to the destination after which time the destination can respond by arbitrating with its own arbitration number in order to service the source.

In other words, when servicing an interrupt or DMA request, the point at which the destination obtains service is based on the arbitration priority of both the agent requesting service (i.e., the source) and the agent providing service (i.e., the destination). If either the source or destination, or both, have a low priority in the arbitration scheme, (i.e., it is less likely to get control of the bus quickly) then the latency period can become very long.

Thus, there is a built-in time overhead for performing DMA or interrupt requests based on the need to arbitrate for control of the bus at both the source and destination points. The length of arbitration is dependant on the priority of both the source and the destination as reflected in their respective arbitration numbers. Accordingly, in data processing systems with multiple agents, a new interrupt or DMA request mechanism is needed which minimizes the latency period. Such a scheme would insure optimum efficiency in bus performance.

As will be described, the present invention provides a faster and simpler way by which a bus architecture such as MBII can support interrupt and DMA requests. According to the concept embodied by the present invention, the source uses the arbitration number of the destination—rather than its own arbitration number—when requesting service from the destination. This mechanism is called "destination request". In the destination request scheme of the present invention, the priority of the DMA or interrupt request is solely dependant on the arbitration number of the destination and not on the priority of the source. As a result, the latency period is reduced to levels comparable to that of bus architectures employing discrete interrupt or DMA request lines.

SUMMARY OF THE INVENTION

An improved method of supporting interrupt requests in certain bus architectures is disclosed. According to the invented method, the source, instead of using its own arbitration number, uses the arbitration number of the destination when performing an interrupt or DMA request. The destination recognizes that it has immediately been granted bus ownership even though it was not arbitrating for the bus originally. The destination can therefore immediately assume that a request has occurred and immediately thereafter begin its request service routine.

The service routine first determines the source of the request. In the previous source request approach, this information is included as part of the message. In the presently invented destination request approach, the destination software interrogates the different agents (i.e., data processing units and peripheral devices coupled to the bus) to determine the source.

The primary benefit of the present invention is that the latency period for the destination request approach is now about the same as for a bus architecture employing discrete request lines. An added benefit or advantage for the present invention is that the arbitration hardware needed to implement a destination request mechanism, is far less complex than what is normally required in the source request scheme.

Furthermore, the present invention still accommodates message sending from the source to the destination using a source request mechanism. If the user elects message sending, the destination is permitted to act upon the message immediately by obtaining bus ownership. On the other hand, if the source lacks the intelligence features for sending a message, then the destination request scheme may be utilized, whereby the source simply directs the destination to read and write to it. Hence, a further advantage of the present invention is the reduced cost of hardware or software on each of the boards or agents.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 1 is a timing diagram illustrating a prior art method by which one agent may inform another of the need for service.

FIG. 2 is a timing diagram illustrating an interconnect sequential block read according to the present invention.

FIG. 3 is a block diagram of the overall system structure which shows how requesting agents can simultaneously supply encoded information to the destination.

FIG. 4 is a block diagram outlining the hardware units utilized in the currently preferred embodiment of the present invention.

DESCRIPTION OF THE PRIOR ART

Referring to FIG. 1, a timing diagram of a source request scheme, such as that found in the MultiBus II architecture, is shown. According to the method defined by the timing diagram of FIG. 1, the agent that is going to request service (i.e., the source) takes immediate control of the bus and executes memory, I/O, or message cycles to agents that could service the request (i.e., the destination agent). This process begins following the negative going transition 10 of the signal labelled BREQ, and the valid logic level transition 10 of the signal labelled ARBIT.

The requesting agent (source) then asserts the address of the replying agent (destination) memory, I/O, or message space. One or several source transfer cycles take place to inform the destination agent of the service requested. The requesting agent (source) asserts a requestor ready (REQ.RDY) signal when it is prepared for the data exchange. Similarly, a replying agent (destination) asserts a replier ready (REPLIER.RDY) signal when it is prepared to proceed to transfer the data. Only upon the assertion of both ready signals is the transfer cycle completed. The source transfer cycles continue until the EOT line is asserted.

The replying agent (destination) must now arbitrate for the bus in order to service the request made by the requesting agent (source). This arbitration period may be very long if other agents with higher priority are also arbitrating for the bus. Once the destination becomes the bus owner it also becomes the requesting agent. The source now assumes the role of the replying agent. The destination can then proceed to directly service the source.

It is appreciated that the method defined by the timing relationship of FIG. 1 is also used by buses with discrete request lines, since a single request line may be enabled by several sources requesting service. When used in this manner, the destination software must execute memory or I/O cycles to determine which of the possible sources are requesting service. This results in many destination transfer cycles. Thus, discrete request lines only remove the need for source transfer cycles.

DESCRIPTION OF THE PREFERRED EMBODIMENT(S)

A destination request scheme in which the priority of the request is made solely dependant upon the arbitration number of the destination and not the priority of source, is described. In the following description, numerous specific details are set forth such as bit lengths, bus widths, etc., in order to provide a thorough understanding of the present invention. It will be obvious, however, to one skilled in the art that these specific details need not be used to practice the present invention. In other instances, well-known structures and circuits have not been shown in detail in order to avoid unnecessarily obscuring the present invention.

In the timing diagram of FIG. 2, the destination concept of the present invention is defined preferably using a MBII type of cycle. According to the present invention, when the source requests service it uses the arbitration number of the destination. The destination is then granted bus ownership even though it was not arbitrating for the bus itself. (See FIG. 2 which illustrates a source request cycle). Thereafter, it can immediately assume that a request has occurred and can then begin the request service routine. If the destination is the present bus owner, one of the unused reserved lines at MBII can be enabled by the source to indicate the service is requested of the present bus owner. The destination would then know not to relinquish bus ownership until after it executes the request service routine.

The destination must first determine the source of service request. In the present invention, the destination software could interrogate the different agents to determine the source by executing destination transfer cycles as outlined in FIG. 1. The destination could also use the aforementioned reserved lines or other lines to allow the source to identify itself.

In the preferred embodiment of FIG. 2, the source requesting service initiates a request for service along the parallel bus by asserting the bus request (BREQ) signal and transmitting a digital code corresponding to the unique destination agent arbitration number on an identification (I.D.) bus coupled to all system agents. This is shown occurring at transition point 20 in FIG. 2. An arbitration cycle then commences which, in case of MultiBus II, is always three clock pulses long. During the arbitration process any agent who requests ownership of the bus can begin arbitrating. After three clock pulses, however, every agent except the one granted bus ownership falls out of the arbitration process. The destination is granted bus ownership in the example of FIG. 2 at clock pulse time 21.

The destination then asserts request phase (REQ.-PHASE) and requestor ready (REQ.RDY) signals, which is shown occurring at transition point 23, when it is prepared to determine the source of the service request. At this time the bus ownership is also locked as indicated by transition 25. Lock is a standard MultiBus II feature that allows the owner of the bus to hold onto the bus until the data transfer or conversation between the source and destination is complete. The lock feature prevents other agents from arbitrating for bus ownership once the data exchange or transfer has begun. Lock is relinquished from the bus at transition 31 in FIG. 2 after all of the data cycles have been completed.

The access made by the destination at transition 23 is an interconnect space read access to card slot 31. MultiBus II presently defines an agents' access to slot 31 as an access to its own interconnect space. This access in present MultiBus II systems does not result in a bus cycle. Rather, the presence of this type of access cycle on the bus may be uniquely defined as an interconnect sequential block read (ISB).

An ISB read is simply an interconnect access on the bus to slot 31 embellished with sequential block transfer to return encoded information relative to which agent is requesting service and the type of service requested. As is shown in FIG. 2, this information is received by the destination in four clock cycles (approximately 400 nanoseconds). This is considerably faster than the transfer cycle method shown in FIG. 1.

In the example provided by the timing diagram of FIG. 2, information from a first read cycle is provided at clock pulse 28, labelled Data A. This information may, for instance, correspond to an interrupt request. The second packet of information arrives at clock pulse 29, labelled Data B, which may correspond to a DMA request. Finally, to maintain the integrity of the bus a parity check is included to check for soft and hard errors on Data A and Data B. The parity check is performed at the clock pulse 30. Thus, the encoded information, called Data A, Data B, and parity in FIG. 2 is returned by all the agents requesting service. Individual information bit is uniquely assigned to each agent.

Referring now to FIG. 3, there is shown a block diagram of the overall system structure. Once again using MBII as the preferred vehicle of implantation, FIG. 3 illustrates how requesting agents can simultaneously supply encoded Data A, Data B and Data C information to the destination. Each slot includes a signal line denoted LATCHN. The LATCHN line is conventionally used for card slot initialization under a scheme which is commonly known as geographical addressing. Once each board has been powered up and properly initialized, the LATCHN pin is usually ignored. However the currently preferred embodiment of the present invention uses the LATCHN pins as a means to return information back to the destination as will be described in more detail below.

Each slot, and therefore each installed agent, has its LATCHN line attached to a unique ADDR/DATA line of bus 36. When an ISB is executed, each agent can individually control one of the ADDR/DATA lines via the LATCHN lines. By way of example, if only agents in slots 10 and 17 wanted to request service, the associated LATCHN lines are driven to logical "0". The LATCHN line in slot 6, and other non-requesting agents are driven to a logical "1". The ADDR/DATA lines read by the destination reflects this pattern. The source uses the LATCHN line to indicate to the destination that it is the particular agent requesting service. The arbitration and control lines for the system shown in FIG. 3 are provided by buses 34 and 35, respectively.

Referring to FIG. 4, there is shown a block diagram of the hardware configuration for the currently preferred embodiment of the present invention. The destination hardware comprises an arbitration decode unit 40 which is coupled to all of the other agents in the system through the arbitration lines 34.

The arbitration decode circuitry monitors the arbitration lines and compares their values with the local arbitration number. A valid comparison indicates that other agents on the bus are requesting service. The arbitration decode unit 40 then generates an automatic cycle request to the interconnect access circuitry block 41. The automatic cycle request directs the interconnect access circuitry block 41 to execute an interconnect sequential block read (ISB). It should be appreciated that the use of an automatic cycle obviates the need for unnecessary communication between the destination hardware and the CPU. This saves valuable CPU time. The destination decode unit 40 receives the local arbitration number of the destination agent along line 49. The automatic cycle request generated by decode unit 40 is input into the interconnect access circuitry 41 along line 50.

Interconnect access circuitry block 41 drives the address and data lines 36 and control lines 35 to execute an ISB. Basically, block 41 operates by performing a MultiBus II read cycle. It comprises a state machine which implements the waveforms of FIG. 2. The state machine itself may comprise either a low cost CPU or an arrangement of programmable logic, (e.g., PALs). Also included in block 41 is circuitry for generating parity check information.

After the interconnect access circuitry drives the ADDR/DATA and control lines, the requesting agents return the encoded pattern to the decode mapping and parity check circuitry 42. Decode mapping and parity check circuitry 42 generates interrupt and DMA requests to the local bus reflecting requests of agents on the bus. In other words, once the encoded information is received from the source hardware, the decode mapping and parity check unit 42 organizes the data and information into standard DMA request or interrupt request format for the operating system.

A polling cycle input is provided to block 41 along line 51. This allows the CPU to override the destination interconnect access circuitry to poll the source hardware and obtain information on a very simple, very fast basis. By using the polling cycle override, the CPU can obtain information within four clock cycles.

The source hardware is divided into four parts. The interconnect access and request circuitry block 44 monitors the bus for an interconnect access to slot 31. Upon detecting an access to slot 31 and a pending request, the circuitry of block 44 enables buffer 45 and drives the appropriate data and parity information onto the ADDR/DATA bus 36. Buffer 45 drives this information onto the bus via LATCHN 37. Independently, the arbitration number selection circuitry 48 monitors DMA and interrupt requests and generates appropriate arbitration numbers for the arbitration logic unit 47. Thereafter, the arbitration logic unit 47 drives the bus arbitration lines 34 with appropriate destination arbitration numbers.

It should be understood that existing MultiBus II compatible boards, need only be retrofitted with the interconnect access circuitry blocks 47 and 44 along with the appropriate buffer 45 in order to make them fully compatible with the destination request concept of the present invention. Furthermore, basing the request on the arbitration number of the destination in no way interferes with other activities or functions of the system. Other boards or slots have no way of determining whether the source or destination is actually driving the bus arbitration lines. The same is true of the LATCHN line since during normal MultiBus II cycles the LATCHN pin remains attached to the ADDR/DATA lines.

In the specific interrupt sequential block read that is performed in accordance with the currently preferred embodiment, boards or agents which do not have the additional interconnect access circuitry have their LATCHN lines pulled high through resistors on the bus backplane and therefore simply ignore the activity on the ADDR/DATA bus. Hence, prior art boards may be included in a system which incorporates the present invention without interfering with data transfer.

Whereas many alternations and modifications of the present invention will not doubt become apparent to a person of ordinary skill in the art after having read the foregoing description, it is to understood that the particular embodiments shown and described by way of illustration are in no way intended to be considered limiting. For example, although this disclosure shows a particular way of implementing a destination request concept, other implementations are also possible. Therefore, reference to the details of the preferred embodiment are not intended to limit the scope of the claims which themselves recite only those features regarded as essential to the invention.

Thus, a destination request mechanism by which one agent (source) informs another agent (destination) that it needs to be serviced, has been disclosed.

What is claimed is:

1. In a bus for transferring data between a plurality of data processing agents, a method by which a first agent informs a second agent of the need for service, said method comprising the steps of:
 arbitrating for ownership of said bus by said first agent using an arbitration number of said second agent;
 granting control of said bus to said second agent; and
 allowing said first agent to send encoded information to said second agent identifying itself as the requesting agent.

2. The method of claim 1 wherein said encoded information also identifies the type of service requested.

3. The method defined in claim 2, wherein said second agent may generate a lock signal, said first agent then applying said encoded information to said local bus until said lock signal is deasserted.

4. The method defined by claim 3 wherein said encoded information is sent to said second agent within four clock cycles.

5. In a bus comprising arbitration lines, address and data (ADDR/DATA) lines, and control lines for transferring data between a plurality of data processing agents, a method by which a source agent requests service from a destination agent comprising the steps of:
 arbitrating for ownership of said bus by said source based on the arbitration number of said destination;
 granting control of said bus to said destination; and
 transferring encoded information from said source to said destination identifying said source as the requesting agent and also identifying the type of services to be performed.

6. The method defined by claim 5 wherein said transferring step includes the step of said destination driving said ADDR/DATA and control lines to execute an interconnect access read on said bus to an interconnect space of said destination.

7. The method defined in claim 6, wherein said destination may generate a lock signal, thereby allowing said destination to maintain ownership of said bus until said destination deasserts said lock signal, and then said source applying said encoded information to said local bus until said lock signal is deasserted.

8. The method defined by claim 6 wherein said encoded information is transferred to said destination within four clock cycles.

9. The method defined by claim 6 wherein said arbitration step includes the steps of monitoring said arbitration lines and comparing the arbitration numbers present on said lines with the local arbitration number of said destination, a valid comparison indicating that some other agent on said bus is requesting service, and upon occurrence of said valid comparison generating an automatic cycle request: and wherein said transferring step includes the steps of said destination driving said ADDR/DATA and control lines to execute said interconnect access read in response to said automatic cycle request, and generating interrupt and direct memory access (DMA) requests on said bus in response to said encoded information received from said source.

10. The method defined in claim 9 wherein said step of executing said interconnect access read comprises the step of performing an interconnect access on said bus to slot 31.

11. The method of claim 10 wherein said transferring step includes the step of said destination receiving said encoded information in four clock cycles.

12. The method defined by claim 9 wherein said source includes an arbitration circuit for monitoring said DMA and internet requests and for driving said bus with the arbitration number of said destination, said transferring step further including the following steps:

monitoring by said source of said bus to detect when said interconnect access read occurs, and upon such detection;

enabling a buffer to drive said encoded information onto said ADDR/DATA lines.

13. The method defined by claim 12 further including the step of driving information onto said ADDR/DATA lines through a LATCHN line by said source.

14. In a computer bus for transferring data between a plurality of data processing agents, a method by which a first agent informs a second agent of the need for service comprising the steps of:

arbitrating for ownership of said bus by said first agent using the arbitration number of said second agent;

granting ownership of said bus to said second agent; and communicating the identity of said first agent to said second agent.

15. The method defined by claim 14 wherein said communicating step comprises having said second agent execute a request service routine to interrogate said plurality of agents, said second agent thereby determining the identity of said first agent and type of service requested.

* * * * *